(12) United States Patent
Hartley et al.

(10) Patent No.: US 6,498,220 B2
(45) Date of Patent: Dec. 24, 2002

(54) REACTOR PRODUCT DISCHARGE SYSTEM

(75) Inventors: Ivan Jeremy Hartley, St. Albans, WV (US); Guadalupe Garcia Leal, Victoria, TX (US); John Roberts Parrish, Cross Lanes, WV (US)

(73) Assignee: Union Carbide Chemicals & Plastics Technology Corporation, Danbury, CT (US)

(*) Notice: Subject to any disclaimer, the term of this patent is extended or adjusted under 35 U.S.C. 154(b) by 1 day.

(21) Appl. No.: 09/888,169

(22) Filed: Jun. 22, 2001

(65) Prior Publication Data

US 2001/0034422 A1 Oct. 25, 2001

Related U.S. Application Data

(62) Division of application No. 09/287,371, filed on Apr. 7, 1999, now Pat. No. 6,255,411.

(51) Int. Cl.[7] .................................................. C08F 2/34
(52) U.S. Cl. ........................... 526/88; 526/68; 422/139; 422/141
(58) Field of Search ............................ 526/901, 68, 88; 422/139, 141

(56) References Cited

U.S. PATENT DOCUMENTS

| | | | |
|---|---|---|---|
| 4,003,712 A | 1/1977 | Miller | 23/288 |
| 4,032,391 A | 6/1977 | Moked et al. | 159/47 R |
| 4,255,542 A | 3/1981 | Brown et al. | 526/88 |
| 4,302,565 A | 11/1981 | Goeke et al. | 526/88 |
| 4,372,758 A | 2/1983 | Bobst et al. | 55/48 |
| 4,535,134 A | 8/1985 | de Lorenzo et al. | 526/88 |
| 4,621,952 A | * 11/1986 | Aronson et al. | 406/138 |
| 5,453,471 A | 9/1995 | Bernier et al. | 526/68 |

* cited by examiner

Primary Examiner—David W. Wu
Assistant Examiner—William Cheung (57) ABSTRACT

A process is disclosed for removing particulate product from a fluidized bed reactor to optimize, within the constraints of the product removal cycle, conservation of gas in which the product is entrained. Data are compiled on the time required for equalizing pressure between product discharge tanks, and these data are used to determine the optimum times for various valves to be open. Product movement steps and equalization steps can be performed simultaneously.

17 Claims, 8 Drawing Sheets

REACTOR PRODUCT DISCHARGE SYSTEM

CROSS REFERENCE TO RELATED APPLICATIONS

This application is a divisional of application Ser. No. 09/287,371 filed. Apr. 7, 1999 U.S. Pat. No. 6,255,411 Jul. 3, 2001.

FIELD OF THE INVENTION

This invention relates to the production of polyolefins in fluidized beds, and particularly to an efficient method of removing polymerized product from a fluidized bed reactor at a desired rate of production while optimizing the conservation of fluidizing gas.

BACKGROUND OF THE INVENTION

In the production of poloyolefins in fluidized bed reactors, a long standing problem has been the loss of unreacted monomers and other components of the fluidizing gas as a consequence of removing the solid product from the reactor. The polymer product is in the form of small particles and is generally removed by passing them, usually by positive gas pressure transfer assisted by gravity, while still more or less entrained in, or at least surrounded by, the gaseous atmosphere predominating in the reactor. Regardless of the system of valves which causes the flow of solid product to the desired destination, the gas leaving the reactor along with the product generally contains a significant volume of unreacted monomer. This unreacted monomer represents an economic loss in at least two ways—it is no longer in the reactor where it can form the desired product, and it represents an environmental and safety issue which must be dealt with. The fluidizing gas may include inert gases used, for example, to control the dew point of the recycle gas. This also represents an economic loss. It is therefore desirable to minimize the amount of gas accompanying the product as it leaves the reactor. There is also a secondary effect, arising from the care taken to minimize the removal of gas with the finished product—the systems developed to assure only a minimal loss of gas tend to retard the removal of solid product, which can cause the entire process to be dependent on the rate of product removal rather than the otherwise possible rate of production. It is highly undesirable for the production rate of a large, expensive reactor to be limited by the product removal system.

In Aronson's U.S. Pat. No. 4,621,952, it is pointed out that the original Union Carbide fluidized bed process for making polyolefins included a gas lock zone associated with the product discharge train. Unreacted monomer accompanying the product resin was vented and recycled back to the reactor by compression. See U.S. Pat. Nos. 4,003,712, 4,032,391, 4,255,542, and 4,302,565. The Aronson '952 patent describes the use of a settling zone to fill a vessel with as much solid material as is practical, thus minimizing the amount of gas in the settling zone or vessel before it is sealed off by appropriate valving from the rest of the system. It also describes a transfer zone downstream from the settling zone. While discharging to the transfer zone, the settling zone reaches an intermediate pressure which is then preserved and can be increased after the settling zone is emptied by connection to another settling zone containing higher pressure gas, to reduce the amount of gas that can enter the settling zone from the reactor in the next cycle.

In U.S. Pat. No. 4,535,134, the loss of gaseous monomer during solid product removal from a horizontal reactor is reduced by controlling the powder level in a receiving container.

SUMMARY OF THE INVENTION

Our invention is a method of product removal from a fluidized bed polyolefin reactor which optimizes the conservation of monomer and other gas components within the time available for the product discharge function. The invention calls for a plurality (preferably two) parallel sets or series of vessels for receiving product from the reactor. The product is passed, in each parallel train, first to a first stage vessel, then to a second stage vessel having a reduced pressure, and finally to a conveyor, bin, or other end destination of a pressure lower than that of the second stage vessel. The conveyor, bin, or other end destination may have a pressure lower than atmospheric—for example, where gas is drawn from it by a vacuum—but may also be atmospheric or higher than atmospheric. Optionally, a third stage vessel of further reduced pressure may be inserted between the second stage vessel and the final destination. After each discharge from one vessel to another, connection is made between the just-filled vessel and the equivalent one in the other train, so that gas may pass from the higher pressure vessel to the lower pressure vessel. Appropriate valves are manipulated by a control system which takes into account the pressures and volumes of gas in both vessels over time, the effect (optionally) of solids content in the vessel on the volume of gas in the vessel, the flow resistance characteristics of the connections between the vessels, and the overall product discharge cycle time. On-line determination of the flow and fill characteristics of the current product can be utilized with or without historical data. The control system allocates a time for equalization at each stage to permit the most efficient sequence of steps—that is, to permit the removal of all product made within the discharge cycle time period, with a minimum or optimum level of gas loss. The sequence of steps includes as an option the simultaneous performance of certain valve operations. That is, more than one step may be performed at the same time, as will be seen below.

DETAILED DESCRIPTION OF THE INVENTION

This invention addresses the problem of maintaining optimal operation of the product discharge or removal system in a fluidized bed polymerization reactor such as is used in the "Unipol" and other processes, to maintain desired production rates while minimizing losses of cycle gas. Optimizing performance of the product discharge system is accomplished by adjusting the duration of each step within a product discharge time cycle. Time allocations for the functions of interest are determined by the timing of opening and closing valves. The valves are preferably controlled by a digital controller, which is programmed to follow a specific sequence. The time spent in each of the steps in the sequence can be adjusted to provide for a desired rate of reactor discharge with minimal loss of cycle gas.

The usual or typical operation of a large fluid bed polyolefin reactor calls for the establishment of a product discharge cycle time based on the production rate for a similar or current product. Generally there is a physical or volumetric limit to the amount of product that can be handled in the product discharge equipment. But this is not to say that there is always a predetermined product discharge cycle time. The product discharge operation and/or the sequence of steps for product discharge may be determined without regard to a predetermined overall product discharge cycle time, and this variation of conducting the process is within the invention's scope or utility, although much of the following description assumes an allotted amount of time for the product discharge cycle, defined to be a series of steps for removing product which is used through a plurality of iterations. Where there is no predetermined product discharge cycle time, our invention may still be used to conserve gas by controlling the passage of gas from vessel to vessel as described herein, and/or by simultaneously performing the various process steps described herein.

The invention includes a method of automating the process by which adjustments are made in the discharge tank control procedure. The invention includes monitoring discharge tank performance, with automated adjustment of the parameters needed for performance optimization. The invention therefore can ensure a high level of discharge tank system performance and at the same time free operating personnel for other tasks.

Figure 1:
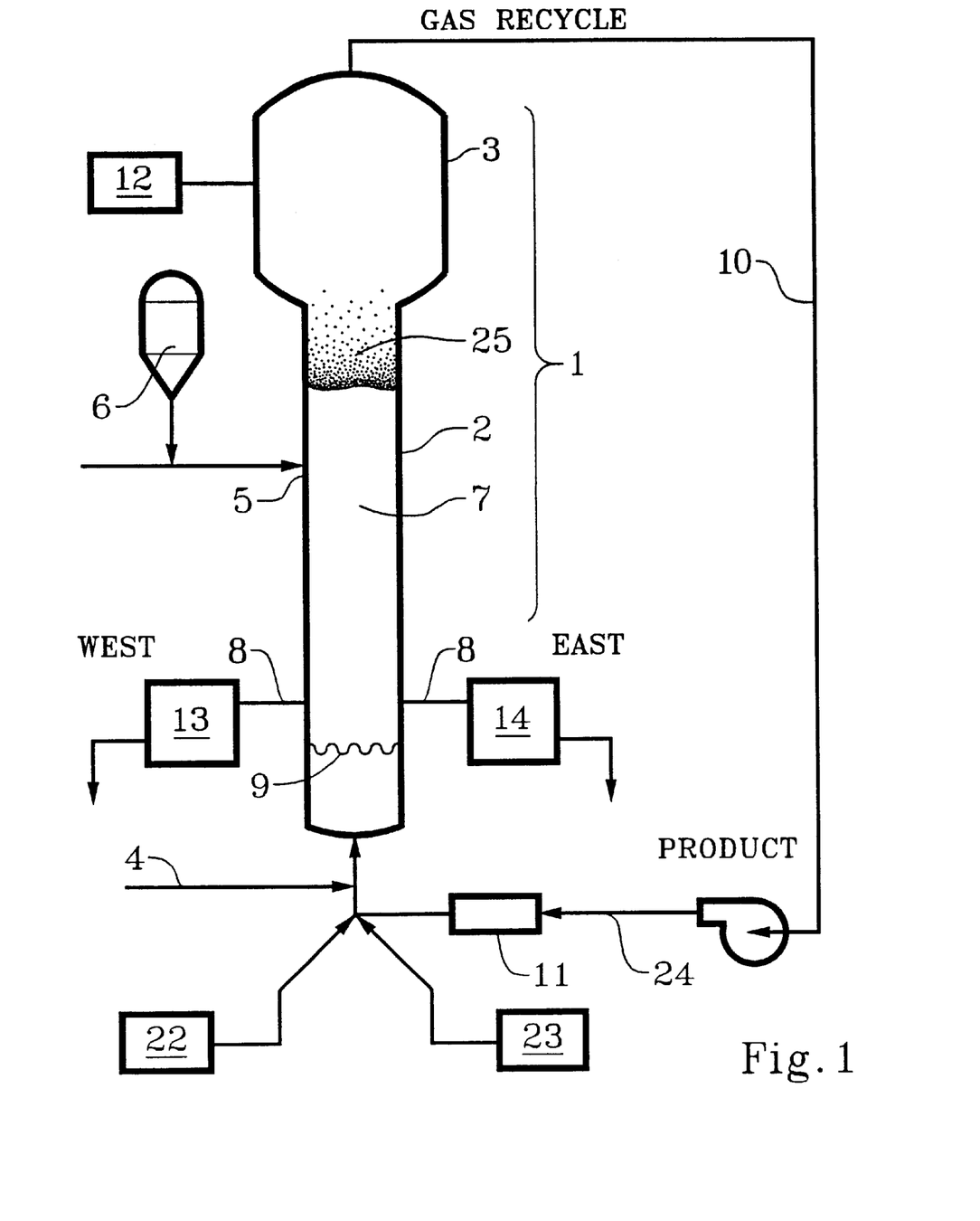
FIG. 1 is a schematic of a typical fluidized bed olefin polymerization reactor showing the recycling of gas and the product removal system.

FIG. 1 shows the basic overall operation of the reactor, including basic functions of the prior art product removal system. In FIG. 1, reactor 1 is a standard "Unipol" reactor, a type commonly used for making polyethylene, ethylene copolymers, and other olefin polymers. The reactor 1 includes straight section 2, which typically extends 50 feet above distribution plate 9, and expanded section 3. As is known in the art, the raw material monomer is continuously introduced in the gas or liquid phase, often near the bottom of the bed, shown schematically as line 4, and an appropriate catalyst from source 6 is introduced into the fluid bed at a point such as point 5. Cocatalyst and other additives may be introduced from sources 22 and 23. Particles of polymer 25 are formed by the action of the catalyst on the monomer, suspended in reaction zone 7, and withdrawn as product at one or two take-off points 8 usually near distributor plate 9. Product withdrawal is usually initiated when the product inventory in the reactor exceeds a desired value. The inventory in the reactor is generally determined by either the bed level or weight measurements, or from secondary measurements used to infer bed level or bed weight. Upon detection of a high reactor inventory, the product discharge system is initiated to pass product to product discharge zones 13 and/or 14, further explained below. Gas is continuously recycled through line 10 to a heat exchanger 11, where it is cooled and/or condensed to remove the heat of reaction. In an alternate scheme not shown, gaseous feed monomer may be introduced to line 10 and make-up liquid in line 24; line 4 would not be used. Our invention may be used with other variations known to the art for conducting the polymerization process in a fluid bed reactor.

Introduction of a nonreactant gas such as propane, butane, isobutane, pentane, isopentane, hexane, heptane, octane (saturated hydrocarbons having 3–8 carbons), or mixtures thereof into the system will help to control the dew point of the gas phase in the reactor. See U.S. Pat. No. 4,941,929 discussed above. Make-up gas, which generally consists of the monomer, nitrogen, and hydrogen, but may contain isopentane, propane, or other nonreactant gas, is fed to the reactor system at a rate to keep a steady state gaseous composition. The composition of the make-up gas is determined by a gas analyzer 12. The gas analyzer determines the composition of the gas being recycled and the composition of the make-up gas is adjusted accordingly, usually to maintain a desired gaseous composition within the reaction zone 7. The dew point may also be calculated using the gas analyzer (or a separate analyzer) readings or output in a known manner.

The polymer production rate of the bed is controlled primarily by the rate of injection of the catalyst components and monomer. The productivity of the bed may also be modified by increasing the rate of injection of the components and decreased by reducing the rate of injection.

Removal of the particulate product through a take-off point 8 is preferably controlled by a pair of timed valves which may alternately place product in discharge zones 13 and 14, discussed in more detail elsewhere herein. Under a given set of operating conditions, the fluidized bed is maintained at a substantially constant height or weight by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

As indicated elsewhere herein, the product removal zones 13 and 14 are designed to handle certain amounts of product within a given period of time, while conserving as much gas as practical.

Figure 2:
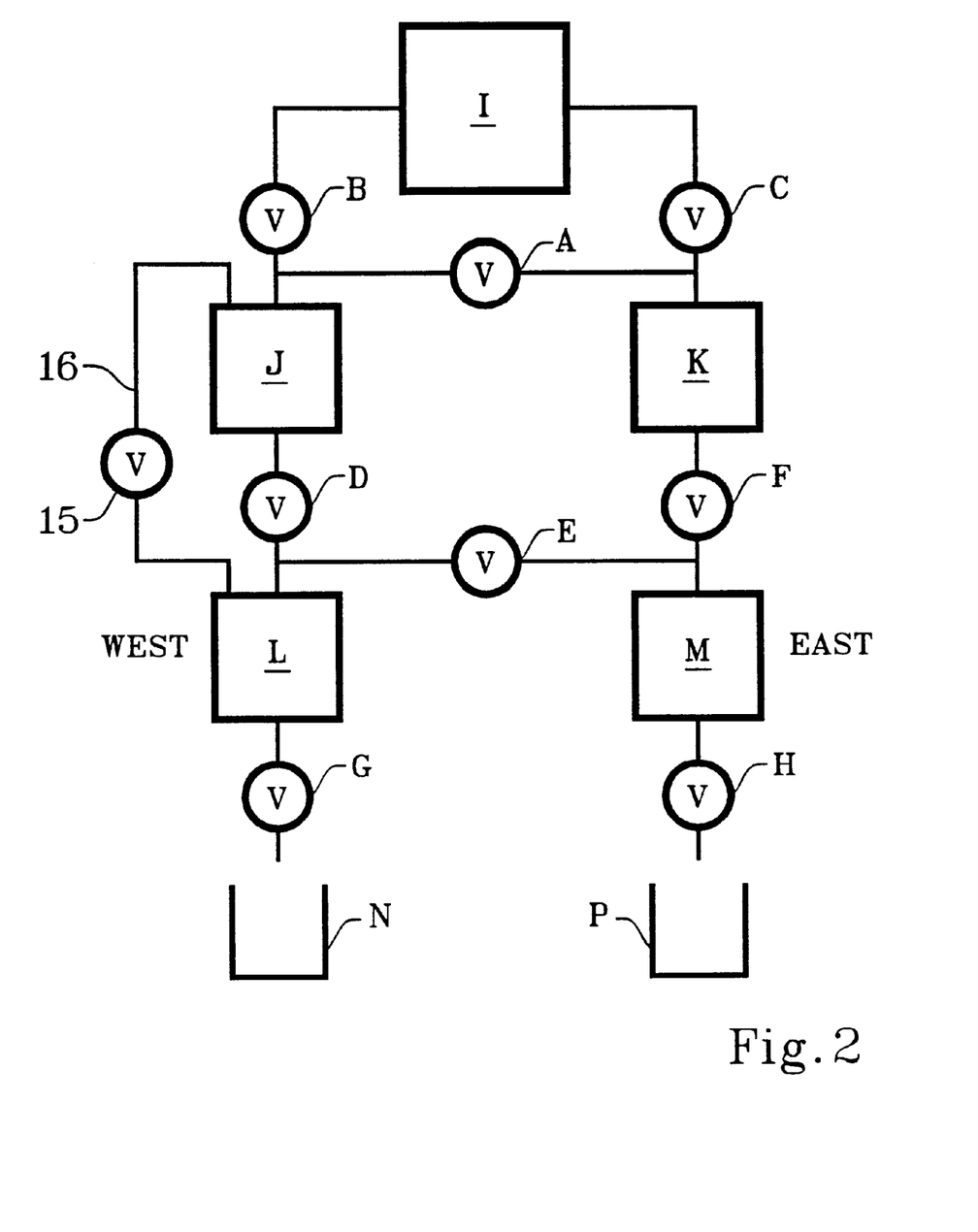
FIG. 2 shows the tanks and valving for a diagrammatic description of a 10-step product removal procedure.

In FIG. 2, the ten-step sequence of the prior art is seen to be improved and optimized by our method. For purposes of explanation and illustration, assume all valves A, B, C, D, E, F, G, and H to be closed. Illustratively, the sequence is begun by a control signal opening valve B or C. The solid product flows from the relatively high pressure reactor I into tank J or K, having a lower pressure, beginning movement of the solid particulate product through the right or left series of valves and tanks, as depicted, which may also be called the East-side and the West-side, seen in FIG. 1 as product discharge zones 13 and 14. Sometimes tanks J and K may be referred to as product discharge tanks and tanks L and M may be called-blow tanks.

Assuming that it was valve B that was opened to fill tank J with product, tank J now has a pressure approximating that of reactor I. Valve B is now closed and valve A is opened, allowing the pressures in tanks J and K to approach equilibrium. Valve A is then closed and valve D is opened, allowing the solid material to flow from tank J, where it had previously been deposited by the operation of valve B, into tank L. In addition to moving solid product, this tends to equilibrate the gas pressures in tanks J and L. Valve D is then closed and valve E is opened, allowing the pressure in tanks L and M to approach equilibrium by moving gas from tank L to tank M. Valve E is then closed and valve G is opened, allowing the solid to flow from tank L to the product bin N or other destination having a lower pressure, which may be a conveyor having a controlled pressure.

The complete discharge cycle will include, after discharge of product, the similar movement in turn of product through the westside or the east-side, whichever was used only for gas pressure equalization during the first five steps. Thus, after the system moves product through tanks J and L as described, additional solid product would now be moved from reactor I to tank K by opening valve C, valve C would then be closed and valve A would be opened to allow tank K to approach gas pressure equalization with tank J. Valve A would be closed and valve F opened to cause product to flow into tank M, valve F is closed and E opened to cause gas to flow into tank L from tank M; valve E is then closed and H is opened to send product to destination P. Thus there are five steps for each of the west-side and the east-side—three product-moving steps with pressure equalizing steps between the first and second, and the second and third.

An optional feature shown on only one side of the product discharge system is a pipe 16 running between product discharge tank J and blow tank L. Usually most of the product moves quite readily because its movement is assisted by a considerable pressure difference. When tank L approaches full, however, and the tank pressures approach equal, product movement depends more on gravity, and gas flow may tend actually to reverse as the displacement of gas by product becomes a significant effect. At this point, valve 15 may be opened to permit displaced gas to flow from blow tank L to product discharge tank J. By permitting the displaced gas to flow through line 16, solid product falling from tank J to tank L does not have to overcome a counterflow of gas moving upwards from tank L, and the solid product movement will be accomplished sooner than otherwise would be the case. It is desirable not only that the product be moved as quickly as the equipment permits, but that the receiving tank be as full as possible. The operation of valve 15 may be in response to a signal representing a predetermined pressure difference between tanks J and L. A similar line and valve can be run between tanks K and M, between reactor I and tank K, and/or between tank J and reactor I. Such lines may be used on both sides of the discharge system. Also, movement of solid product through valve G and/or H may be assisted, particularly near the end of the operation, by adding gas to tank L or M from a source having a higher pressure than the current pressure in destination N or P.

Should the cycle be interrupted for any reason, the valves may be programmed to empty the entire discharge system, as normally it is not desirable for the product to remain quiescent together with gas (it can continue to react) in the tanks for extended periods of time. An interlock system may program the discharge of the product in an orderly manner.

A measure of the efficiency of the operation of the system is the amount of gas which exits the system through valve G or H when the product leaves the system. The loss of gas is minimized by allowing the J and K tanks as well as the L and M tanks to equalize in pressure at the appropriate times during the cycle. The degree to which the tanks equilibrate is in direct relation to the amount of time the equalization valves A and E are open. The time the equalization valves are open is, however, limited by the time available for the entire discharge sequence. Gas conservation is also promoted by assuring that as much product as possible is placed in the tanks at each step, thus minimizing the volume available in the tank for gas, as will be discussed further with respect to FIGS. 3a and 3b. The invention therefore minimizes gas losses from the discharge system while providing for a complete discharge cycle within a prescribed time period.

Persons skilled in the art will recognize that equalizing pressures in tanks J and K (and, at a different stage, L and M) establishes a pressure in tank J, for example, lower than that of reactor I after it (tank J) is loaded with product, so that when solid product is discharged from tank J into tank L, less gas will move to tank L than would be the case if tank J still retained the pressure of reactor I. At the same time, a higher pressure is created in tank K by the equalization, thus reducing the amount of gas able to pass from the high pressure reactor I to tank K when product is later moved into tank K. Without such equalization, product delivered to tank L, for example, in the presence of relatively high pressure gas will take with it (through valve G) a large amount of gas. This would be particularly true where end destination N or P is at a negative pressure, which is sometimes the case.

While this type of sequencing in the past has performed to conserve gas and unreacted monomer component, the practice has not been optimized to conserve the most gas possible within the constraints of the increasing production of the reactors and processes used in them. Product removal must keep up with production and there is a need for a method to optimize gas conservation within variable product removal cycles, depending on the type of product, the production rate, and many other factors.

The invention includes manipulation of the parameters of the plant automation systems. Referring again to FIG. 2, to illustrate this process, consider all valves to be initially closed.

During one or more sequences of valve openings and closings described above, the following information is recorded—(i) the time valve A is open, (ii) the pressures in each of the tanks J and K as a function of time and, optionally, (iii) the solid levels in the tanks J and K as a function of time. Pressure and time are recorded and compiled in a data base for gas flow in both directions, and similar readings are taken for the steps involving gas passing between blow tanks L and M. The data are then analyzed to determine the operating characteristics of the system. The data are regressed to fit a first principles model that describes the operating performance during the firing sequence. The model parameters are used to determine the time parameters (including the duration of the timed steps) of the control system. This is the preferred method. The first principle model describes the time-varying flow of cycle gas between the product discharge tanks J and K through valve A and between blow tanks L and M through valve E. The applicable model equations are $$d\,P_1/dt = a*X \text{ and } d\,P_2/dt = b*X; \text{ with } X = \sqrt{P_1 - P_2}$$

Where t=time, a=a parameter representing the volume of gas in the high pressure tank and the resistance to flow between the two tanks, b=a parameter representing the volume of gas in the lower pressure tank and the resistance to flow between the two tanks, $P_1$=the pressure in the high pressure tank, and $P_2$=the pressure in the lower pressure tank.

Parameters a and b are determined by regression of the pressure versus time data. These parameters can be used to determine the efficiency of gas flow in the system as well as the fill efficiency. It may be observed that in a given facility the resistance to flow between two tanks will differ depending on the direction of flow, and this may be taken into account. Pattern recognition techniques or software may also be used to determine the product removal cycle performance relative to an ideal.

Figure 3A:
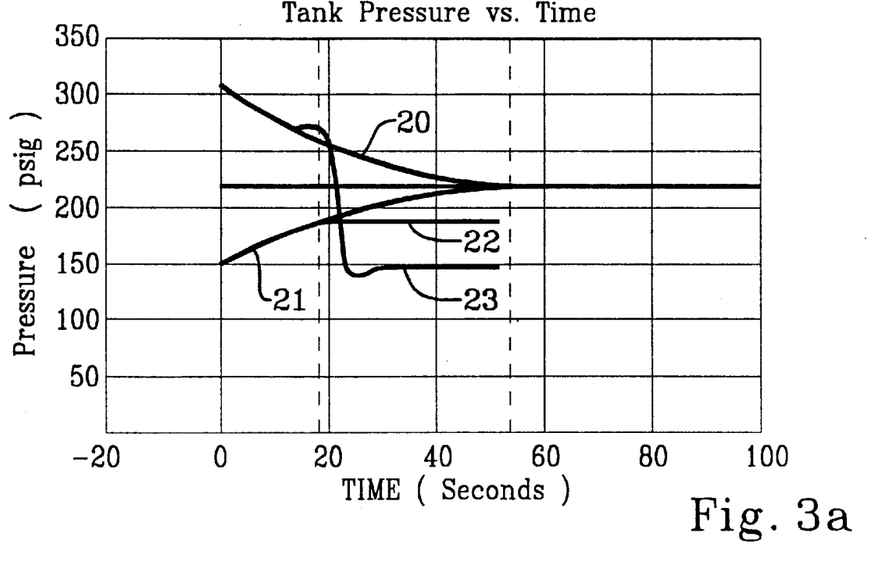
FIGS. 3a and 3b show typical tank pair pressure equalization curves, together with the effects of valve closing before equalization is reached.
Figure 3B:
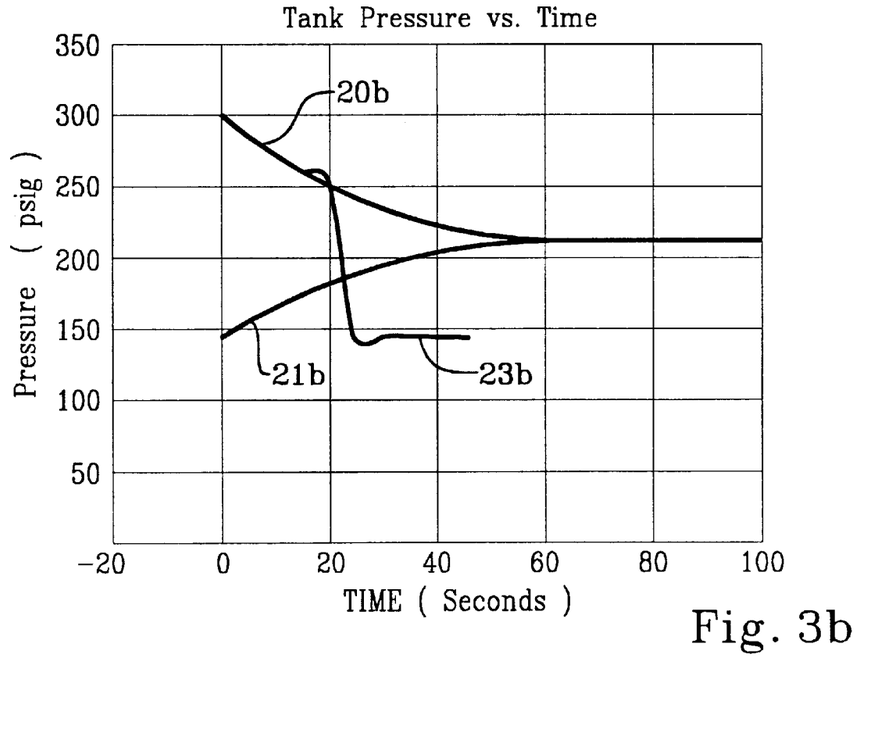

Data representing solid levels and/or weights in tanks are used with the model parameters to calculate the amount of gas in the solid-containing tanks, as well as the amount of product. These will be affected by the resin properties, including shape of the particles, their density, particle size, and porosity. A high bulk density will leave less open volume for the gas than one not so closely packed. As will be seen in the discussion of FIG. 3, the quantity of gas in the high-pressure, solid-filled tank will have a significant effect on the ultimate equalization pressure achievable with a paired "empty" (no solid product) tank.

Fill efficiency is a measure of whether the tank is as full as possible, given the resin bulk density. Fill efficiency may be inferred partly from the pressure changes; the final pressure equalization point is an indication of the volume of product in the "full" tank, as the volume of product is inversely related to the volume of gas at the higher pressure in the tank. Optionally, the current analysis information may be cataloged with historical information describing discharge tank performance.

Figure 4:
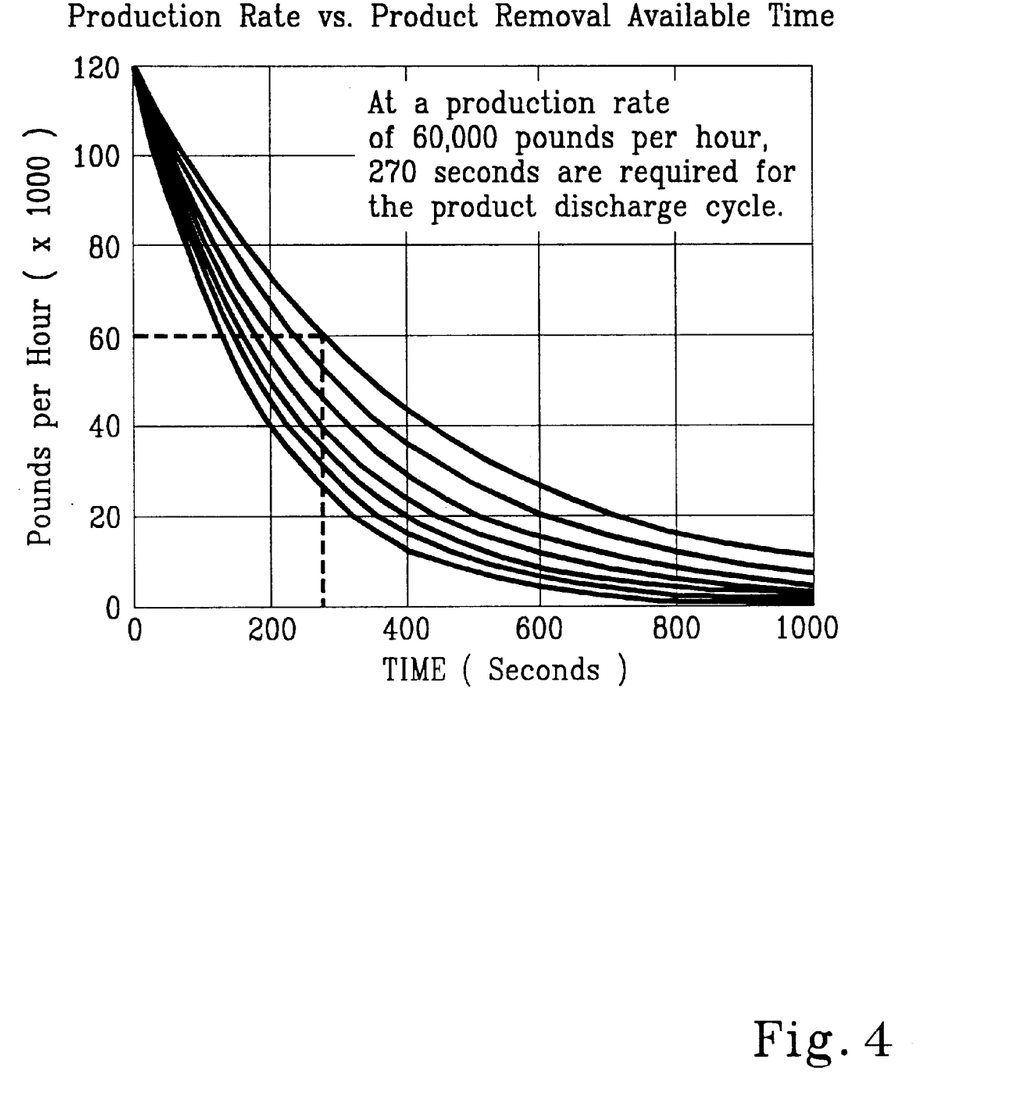
FIG. 4 shows product discharge times available for seven different products at various production rates in a given facility.

Using the historical (optional) and current cycle information, complete the following steps—(a) estimate the total amount of time likely available for the next product discharge cycle, based on current conditions and the particular product being manufactured, and, optionally, historical data, such as compiled and presented in FIG. 4, which reflects the process model parameter and production rate history; (b) adjust control system timers to minimize cycle gas loss in the expected time available for the next discharge tank cycle. This can be done using the parameters of the fitted model or pattern recognition. Preferably, a product movement valve such as valve D, F, G, or H is held open only as long as is necessary to move all the available product, in order to maximize the time available for the pressure in the two tanks above the valves to equalize. The time for the lower tanks to equilibrate can be adjusted in the same manner. FIGS. 3a and 3b illustrate the influence of this time adjustment. Updated parameters may be sent to the discharge tank control system for application to the next cycle of the discharge system. Repeat the steps above.

Referring now to FIG. 3a, tank pressure is plotted against time for tanks similar to tanks J and K of FIG. 2, connected by a pipe similar to the pipe which is intercepted by valve A. If tank J is at 307.65 psi at the beginning of equalization—that is, when valves B, C, D and F are closed and valve A is opened, and tank K is at 150.5 psi, an equal pressure of about 220 psi will be achieved in about 54 seconds for the configuration of tanks, valves and pipes tested, where curve 20 represents pressure in tank J and curve 21 represents pressure in tank K. However, if the overall schedule for product removal will not permit as long as 54 seconds for the equalization step, curves such as curves 20 and 21 will determine the progress towards equalization at any point in time it is decided to terminate the equalization step. Curve extension 22, for example, shows the pressure in tank K if the equalization is stopped at about 20 seconds. Curve extension 23 shows the pressure in tank J after valve A is closed and product is discharged from tank J into tank L. As expected, the pressure in tank J is lower than that of tank K (extension curve 22), since tank J is now connected to tank L, which has a lower pressure. While tank L was earlier discharged to the product end destination, valve G is closed, so we may expect tanks J and L to be at about the same pressure Thus, a third sequential tank may be included (see FIG. 8) to further reduce gas loss.

For FIG. 3b, a different set of parameters was placed in the computer model. Here the pressure in the high pressure tank represented by curve 20b begins at 298.2 psi and the lower curve 21b begins at 145.25 psi. Pressure equalization at about 214 psi is achieved in about 54.4 seconds, the pressures in the two cross-tied tanks following the curves 20b and 21b following the pattern depicted. Curve extension 23b shows the pressure in tank J after valve A is closed and product is discharged from tank J into tank L. It will be observed that in both FIGS. 3a and 3b the equalization pressure is not the average of the beginning pressures; accordingly the equalization pressure is a function of the quantity of gas in the two vessels, while the time required for equalization is determined by the resistance to flow between the tanks, the amount of resin in the tanks, the physical characteristics of the gas, and the initial pressure difference. Thus one may compile data including such variables sufficient to impute the quantity of gas initially in the high pressure tank from a comparison with a similar curve followed by a current equalization step. One will also be able to predict the effect of stopping the equalization at a given point in time, as shown by curves 22, 23, and 23b. Thus our invention includes a process for passing solid particulate product in the presence of gas from a fluidized bed through successive containers to control the passage of gas along with the solid particulate product, wherein gas substantially free of solid product is passed from a high pressure container containing solid particulate product to a low pressure container substantially empty of solid particular product, comprising passing the gas for a time period which is a function of gas flow rates between the high pressure and low pressure containers. As mentioned previously, fill efficiency may be inferred simply from pressure readings versus time in an equalization step, as the amount of gas in the higher pressure tank is inversely related to the volume of solid particulate product it contains. In the example of FIG. 3a, the fill efficiency was calculated to be 77%. For the Example of FIG. 3b, it was calculated to be 78%. Thus our invention includes a method of estimating the amount of solid particulates in a first vessel containing solid particulates together with gas at a first pressure, comprising (a) passing gas from the first vessel to a second vessel through a connection of known pressure drop characteristics, the second vessel containing gas at a second pressure which is lower than the first pressure (b) while the gas is passing from the first vessel to the second vessel, monitoring gas pressure in at least one of the vessels (c) estimating the volume occupied by gas originally in the first vessel at the first pressure by comparing the (at least one) monitored pressure over time to the known pressure drop characteristics, and (d) estimating the amount of solid particulates in the first vessel by subtracting the volume of gas originally in the first vessel at the first pressure from a known volume of the vessel.

Referring again to FIG. 4, a family of curves is presented representing production rate versus the time required for product removal efficiency for seven different products to be made in a given facility. The curves vary with the product resin characteristics, which include not only the monomer content, but many other factors such as molecular weight, density, and catalyst. The curves illustrate that some resins can be discharged faster than others, but in each case the inefficiency of the product removal system can be measured in terms of time. For example, for the uppermost curve, a production rate of 60,000 pounds per hour requires a discharge time for both sides of the system of 270 seconds. Accordingly, optimization must be accomplished within 270 seconds for the product of the uppermost curve produced at a rate of 60,000 pounds per hour. It should be kept in mind that the primary purpose of the product discharge system is to remove product, and therefore it is not normally desirable to cut short the operations of steps which move product from one vessel to another; it is preferable, rather, to hasten the completion of such steps, such as by the use of a line such as line 16 as explained in connection with FIG. 2. More often, however, and in addition to any other adjustments, our invention contemplates cutting short the passage of gas during an equalization step at a point in each equalization step which is as long as desirable to optimize the passage of gas in all such steps. Normally this will mean allocating a time period for each gas pressure equalization step which is less than that which would achieve full equalization.

Figure 5:
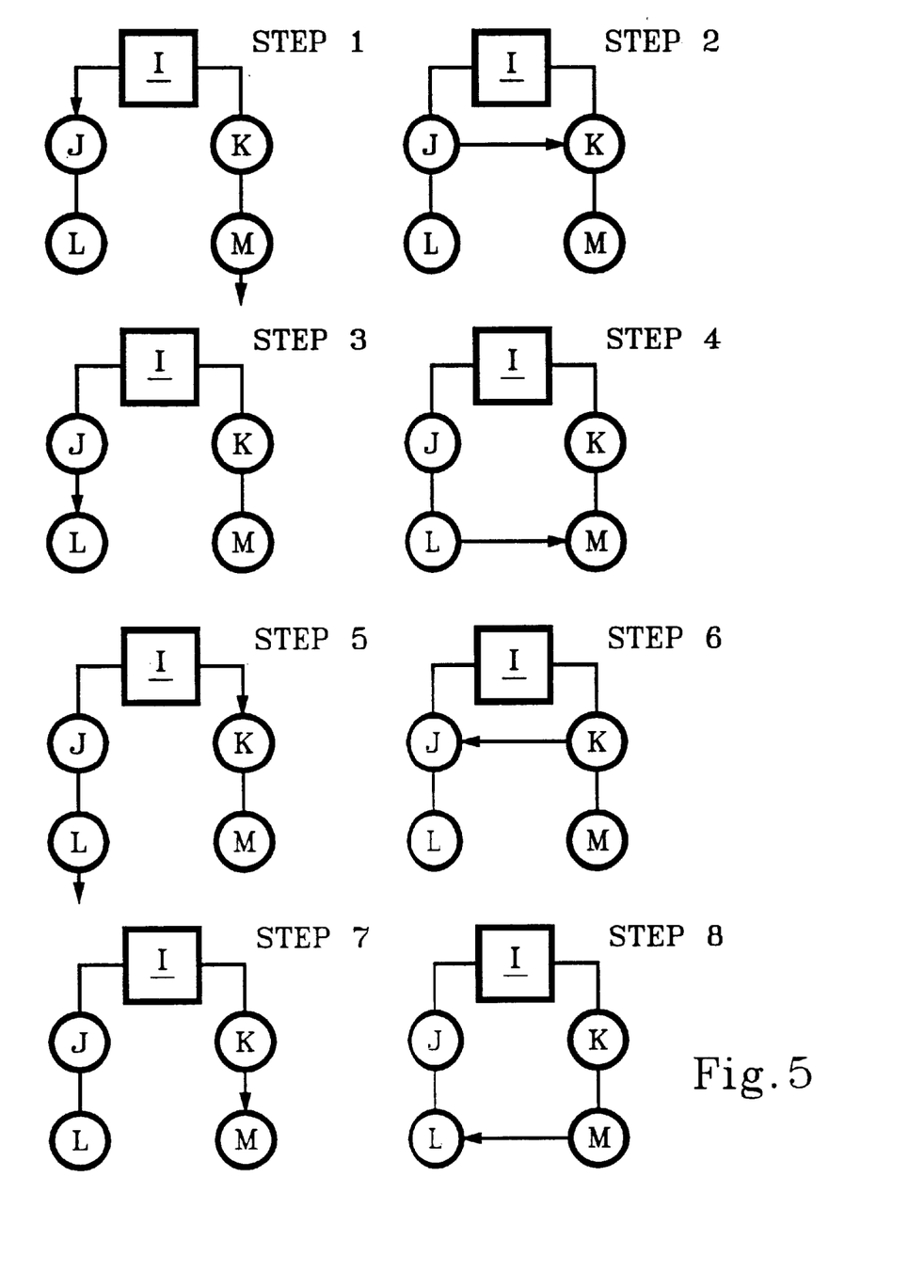
FIG. 5 illustrates an 8-step product removal procedure in block form.

Looking now at FIG. 5, an 8-step sequence for the configuration of FIG. 2 is seen to be presented diagrammatically. The block diagram of FIG. 5 describes a series of steps 1–8. In step 1, product is discharged from the reactor I to tank J while another batch of product is moved from tank M to an end destination having a relatively low pressure, such as a bin or a conveyor. Each of these steps is isolated from the rest of the system by closing the appropriate valves. That is, referring to FIG. 2, only valves B and H are open during this step; all the others are closed. In step 2, only valve A is open to allow gas to flow from tank J to tank K, following a curve similar to that of FIG. 3a or 3b. How long valve A is open is determined by the above described control factors such as fill efficiency, cycle time, and gas flow resistance, to optimize the overall optimization of gas in this and all other steps within the cycle time. For step 3, all valves are closed except valve D, so that product may move from tank J to tank L. In step 4, (again, see FIG. 2) valve E is open to equalize, as far as the allowed time permits, the pressures in tanks L and M, while all other valves are closed. Step 5, then, is similar to step 1 in that the reactor I now discharges product into tank K while valve G is opened to deliver product from tank L to a destination outside the system. Thereafter (step 6), tanks J and K are equalized in pressure for the time period the controller permits valve A to be open, gas flowing this time from tank K to tank J; all the other valves are closed. Then, in step 7, product is moved from tank K to tank M in a manner mirroring step 3, and lastly step 8 equalizes pressures in tanks L and M in a manner similar to step 4 except that the gas moves in the opposite direction. It will be seen that there are four opportunities in this series of steps to control the duration of equalization—two at each tank stage. The optimum overall procedure may include longer valve openings between tanks J and K, and between tanks L and M because there are different amounts of gas to be saved and the pressure differences vary; however, this will depend also on differences in the particular equilibrium curves for the tank pairs—as mentioned above, resistance to gas flow may vary with the direction of gas flow, and accordingly, for example, the time allocated for gas flow from tank J to tank K in step 2 may be different for the opposite flow in step 6.

Figure 6:
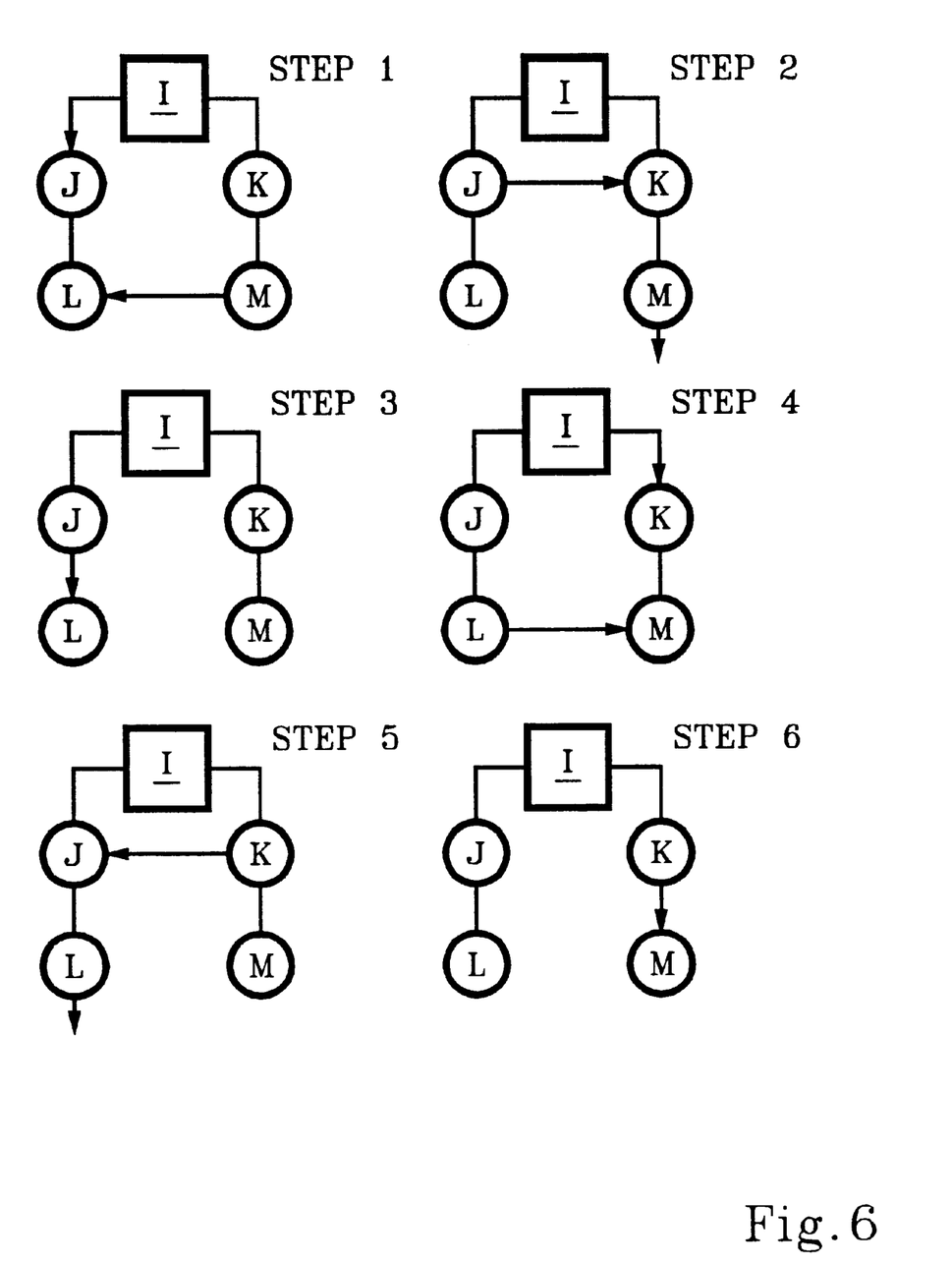
FIG. 6 is a diagrammatic sequence of six product removal steps.

The six-step sequence of FIG. 6 permits additional simultaneous steps, thus providing more time for each step within the overall cycle time determined by the production rate. As seen in step 1, pressure equalization may be performed between tanks L and M (with gas flowing from tank M to tank L) while product is moved from reactor I to tank J. Tanks J and K are equalized in step 2 while product is simultaneously discharged out of the system from tank M. In step 3, product moves from tank J to tank L. Step 4 is the mirror image of step 1 in that the reactor I discharges to tank K while tanks L and M are equalized, the gas moving from left to right, as depicted. Step 5 mirrors step 2, and step 6 mirrors step 3, after which step 1 repeats. Throughout all steps, the only open valves are those which permit the desired product movement or pressure equalization.

Figure 7:
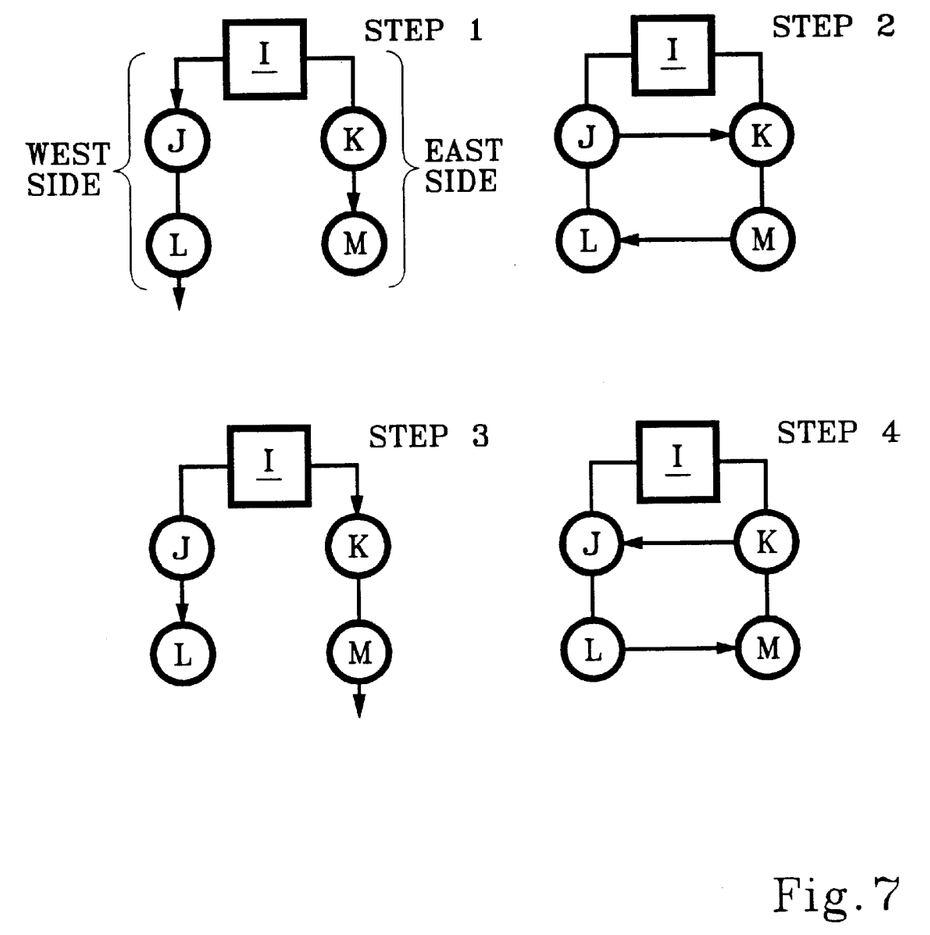
FIG. 7 shows a 4-step product removal sequence.

The four-step sequence of FIG. 7 combines more steps and greatly reduces the time required for product removal through the system. Here, in step 1, product moves from the reactor I to tank J and from tank L to the end destination on the "west"-side while, on the "east"-side, product moves from tank K to tank M, all valves not contributing to these movements being closed. Then, in step 2, both sets of tanks—J and K, and L and M—are equalized in pressure by moving gas from the higher pressure tank to the lower pressure tank, each set of equalizing tanks being isolated from the rest of the system by closed valves. Step 3 mirrors step 1 in that product is moved from the reactor I to tank K, from tank J to tank L, and from tank M to the bin, conveyor or other destination outside the system. Step 4 is similar to step 2 in that both levels of tanks are equalized in pressure. In each step, as before, all valves are closed which do not accomplish the desired product move or equalization. The four-step process, requiring minimum time for product removal, permits control of the steps' duration to be based more on product properties and equipment limitations, and less on an allotted cycle time based on production rate, and allows the longest time for gas pressure equalization.

A modification of the sequence just described will further enhance gas conservation. It frequently happens that, because the pressure is lower in the lower tanks than it is in the upper tanks, product moves faster, in step 1, into tank J and out of tank K, than it does out of tank L. It is therefore possible to begin the pressure equalization in tanks J and K, as depicted in step 2, before terminating the discharge of tank L, depicted in step 1. This permits a longer time for pressure equalization in tanks J and K, after step 2 is fully entered into, than otherwise would be the case, meaning that the termination of equalization can be performed at a point further to the right on the curves of FIGS. 3a and 3b. A similar early initiation of equalization of tanks J and K can begin before step 3 is completed, again permitting a longer time for equalization and conserving more gas than would otherwise be possible.

Figure 8:
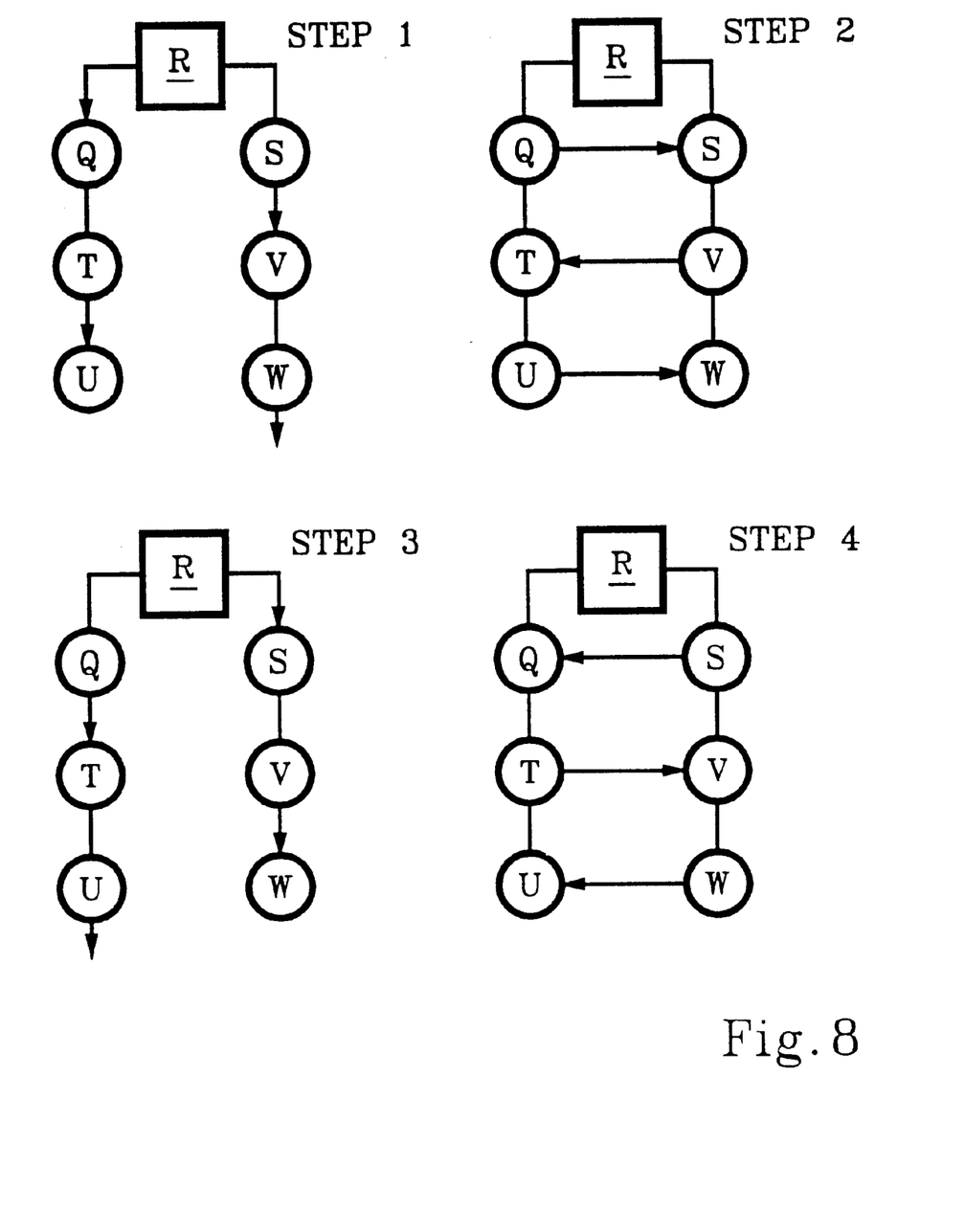
FIG. 8 illustrates diagrammatically a sequence of steps for a 6-tank product removal system.

Further savings may be realized by adding a third stage of tanks as shown in FIG. 8. Here there will be three separate pressure zones between the reactor and atmospheric or other lower pressure on each side. One may move product in a manner similar to that described above, equalizing pressures in the opposite tank after each discharge, as shown in the block diagram of paired parallel tanks Q and S receiving product from reactor R and passing it, respectively, through tanks T, U, and V, W. In step 1, product is simultaneously moved from reactor R to tank Q, from tank S to tank V, from tank T to tank U, and from tank W to the end destination. In step 2, all pairs of tanks on the same stages are equalized in pressure. Step 3 is the mirror image of step 1, and step 4 mirrors step 2.

A fourth level of tanks may be added—steps 1 and 3 would be the product movement steps, and steps 2 and 4 the gas pressure equalization steps, similar to the illustrations of FIG. 8, including all four levels or stages.

It will be appreciated that in all variations, the conservation of gas is accomplished by minimizing the pressure differences between the discharging tank and the receiving tank, or, in the case of the end discharge, between the discharging tank and atmospheric or other pressure lower than that of the last tank. Our invention also enables timing of the equalization steps within the constraints of an overall product delivery schedule which may be determined by the desired production rate and/or the reactor bed level or bed weight and/or the resin properties. Thus our invention includes a method of controlling product discharge from a fluid bed polymerization reactor comprising monitoring bed level or bed weight or both (herein referred to as bed level/weight) of solid particulate product in the fluid bed, generating a signal representing bed level/weight of solid particulate product in the fluid bed, calculating a total discharge cycle time based on that signal, allocating portions or phases of the total discharge cycle time sequentially to each of a plurality of product discharge steps, and initiating product discharge in each of the product discharge steps sequentially.

Thus it will also be appreciated that we optimize gas conservation in the context of the product discharge process, the primary objective of which is to remove the required amount of product within the designated time cycle, while we can minimize gas loss within the time available to do so. Our use of the terms optimum or optimize and minimum or minimize should be understood with the primary objective of product removal in mind. Our invention enhances the conservation of gas in the product discharge process.

What is claimed is:

1. A method of recovering a solid, particulate polymer from a gas-phase, fluidized bed reactor, the reactor containing (i) a fluidizing gas, and (ii) the polymer in a fluidized state at an operating pressure, the method comprising:

Transferring at least a portion of the polymer and the fluidizing gas from the reactor through a first connection to a first vessel, the first vessel having a pressure less than the operating pressure of the reactor;

Transferring a portion of the gas in the first vessel through a second connection to a second vessel such that gas remains in the first vessel, the second vessel having a pressure less than the first vessel;

Transferring the polymer and the gas remaining in the first vessel through a third connection to a third vessel, the third vessel having a pressure less than the first vessel;

Transferring at least a portion of the gas in the third vessel through a fourth connection to a fourth vessel, the fourth vessel having a pressure less than the third vessel; and Transferring the polymer in the third vessel through a firth connection to a fifth vessel, the fifth vessel having a pressure less than the third vessel.

2. A method of claim 1 in which the gas transferred from the first vessel to the second vessel and from the third vessel to the fourth vessel is substantially free of polymer.

3. The method of claim 2 in which the transfer of gas from the first vessel to the second vessel is for a period of time less than that required for the pressure of the first and second vessels to equilibrate, and the transfer of gas from the third vessel to the fourth vessel is for a period of time less than that required for the pressure of the third and fourth vessels to equilibrate.

4. The method of claim 3 in which at least a portion of the gas remaining in the third vessel is transferred substantially free of polymer through a sixth connection back to the first vessel.

5. A method of recovering a solid, particulate polymer from a gas-phase, fluidized bed reactor, the reactor (i) containing (1) a fluidizing gas, and (2) the polymer in a fluidized state at an operating pressure, and (ii) having a separate connection to each of a first and second vessel, each connection adapted for the transfer of polymer and gas under pressure from the reactor to the vessel, the method comprising:

A. While blocking the transfer of fluidizing gas and polymer to the second vessel, transferring at least a portion of the polymer and the fluidizing gas from the reactor through a reactor/first vessel connection to the first vessel, the first vessel having a pressure less than the operating pressure of the reactor;

B. While blocking the transfer of fluidizing gas and polymer from the reactor to the first and second vessels, transferring a portion of the gas in the first vessel through a first vessel/second vessel connection to the second vessel such that gas remains in the fist vessel, the second vessel having a pressure less than the first vessel;

C. While blocking (1) the transfer of fluidizing gas and polymer from the reactor to the first vessel, and (2) the transfer of gas between the first and second vessels, transferring (a) at least a portion of the polymer and the fluidizing gas from the reactor through a reactor/second vessel connection to the second vessel, the second vessel having a pressure less than the operating pressure of the reactor, and (b) the polymer and remaining gas from the first vessel through a first first vessel/third vessel connection to a third vessel, the third vessel having a pressure less than the pressure of the first vessel;

D. While blocking the transfer of fluidizing gas and polymer from (1) the reactor to the first and second vessels, and (2) the fast vessel to the third vessel, transferring (a) at least a portion of the gas substantially free of polymer from the second vessel through the first vessel/second vessel connection to the first vessel, the first vessel having a pressure less than the second vessel, and (b) from the third vessel through a third vessel/fourth vessel connection to a fourth vessel, the fourth vessel having a pressure less than the third vessel;

E. While blocking the transfer of (1) gas and polymer from the first vessel to the third vessel, and (2) gas between the third and fourth vessels, transferring (a) the polymer from the third vessel through a third vessel/fifth vessel connection to a fifth vessel, the fifth vessel having a pressure less than the third vessel, and (b) gas and polymer from t he second vessel through a second vessel/fourth vessel connection to the fourth vessel, the fourth vessel having a pressure less than the third vessel;

F. While blocking the transfer of gas and polymer between (1) the reactor and the second vessel, (2) the first and third vessels, and (3) the second and fourth vessels, transferring at least a portion of the (a) gas substantially free of polymer from the fourth vessel through the third vessel/fourth vessel connection to the third vessel, the third vessel having a pressure less than the fourth vessel, and (b) polymer and the fluidizing gas from the reactor through a reactor/fist vessel connection to the first vessel, the first vessel having a pressure less than the operating pressure of the reactor; and G. While blocking the transfer of gas and polymer from the second vessel through the second vessel/fourth vessel connection to the fourth vessel, and the transfer of gas between the third and fourth vessels through the third vessel/fourth vessel connection, transferring (a) the polymer in the fourth vessel through a fourth vessel/sixth vessel connection to a sixth vessel, the sixth vessel having a pressure less than the fourth vessel, and (b) a portion of the gas in the first vessel through the first vessel/second vessel connection to the second vessel such that gas remains in the first vessel, the second vessel having a pressure less than the first vessel.

6. The method of claim 5 in which the transfers of subparagraph (C) occur simultancously.

7. The method of claim 6 in which the transfers of subparagraph (D) occur simultancously.

8. The method of claim 7 in which the transfers of subparagraph (E) occur simultaneously.

9. The method of claim 8 in which the transfers of subparagraph (F) occur simultaneously.

10. The method of claim 9 in which the transfers of subparagraph (G) occur simultaneously.

11. The method of claim 10 in which the transfer of gas between the first and second vessels and the third and fourth vessels is substantially free of polymer.

12. The method of claim 11 in which the transfer of gas between the first and second vessels is for a period of time less than that required for the pressure of the first and second vessels to equilibrate, and the transfer of gas between the third and fourth vessels is for a period of time less than that required for the pressure of the third and fourth vessels to equilibrate.

13. The method of claim 12 in which at least a portion of the gas remaining in the third vessel is transferred substantially free of polymer through a second first vessel/third vessel connection back to the first vessel simultaneously with the transfer of polymer and gas from the first vessel through the first first vessel/third vessel connection to the third vessel.

14. The method of claim 12 in which the transfers of polymer and gas between vessels are performed within a time period that is a function of the resistance to gas flow between two vessels.

15. The method of claim 14 in which the time period is controlled at least partly by an on-line signal representing an on-line characterization of the gas flow.

16. The method of claim 14 in which the time period is controlled at least partly by a signal representing a predetermined characterization of the gas flow.

17. The method of claim 16 in which the time period is controlled at least patly by a signal representing a predetermined polymer discharge cycle time.

* * * * *